United States Patent [19]

Nigborowicz et al.

[11] Patent Number: 4,521,810
[45] Date of Patent: Jun. 4, 1985

[54] VIDEO SOURCE SELECTOR

[75] Inventors: John J. Nigborowicz, Carmel; Karl L. Friedline, Indianapolis, both of Ind.

[73] Assignee: RCA Corporation, Princeton, N.J.

[21] Appl. No.: 491,178

[22] Filed: May 3, 1983

[51] Int. Cl.$^3$ ............... H04N 5/22; H03K 17/00; H03K 17/56

[52] U.S. Cl. ............... 358/181; 328/104; 307/243

[58] Field of Search ............ 358/181; 328/137, 104, 328/154; 455/133, 134, 135, 136; 307/243

[56] References Cited

U.S. PATENT DOCUMENTS 3,152,319 10/1964 Gordon et al. ............... 328/104 X
4,361,854 11/1982 Wolfe ............... 358/181
4,363,033 12/1982 Lovely ............... 358/181

OTHER PUBLICATIONS

W. T. Shelton, Solid-State Video Switching Matrix, Jul. 1970, discussion of FIGS. 1-4.
Article by R. C. Gerdes, p. 73, believed to be published in EDN Magazine sometime between 1970-1975.
National Semiconductor Corporation CMOS Databook, 1981, pp. 5-152 and 5-156.

Primary Examiner—John C. Martin
Assistant Examiner—E. Anne Toth
Attorney, Agent, or Firm—Paul J. Rasmussen; Peter M. Emanuel; Lawrence C. Edelman

[57] ABSTRACT

A switching arrangement for selecting one of a number of video signals. The circuit includes a switch unit preferably in integrated circuit form of pairs of synchronously operated switches for selecting video signal from a particular one of the video sources. A first switch of each pair is coupled to a respective video source for selectively providing a video signal to a common output when conductive. To provide sufficient isolation at video frequencies, the second switch of each switch pair is coupled between a reference potential and a respective one of a plurality of signal inhibiting stages for providing a control signal to the signal inhibiting stage dependent upon its conductive state. The inhibiting stages are coupled between the video sources and their respective first switches and are responsive to the control signals provided by respective ones of the second switches for selectively attenuating video signal from non-selected video sources and for passing the video signal from the selected video source.

8 Claims, 1 Drawing Figure

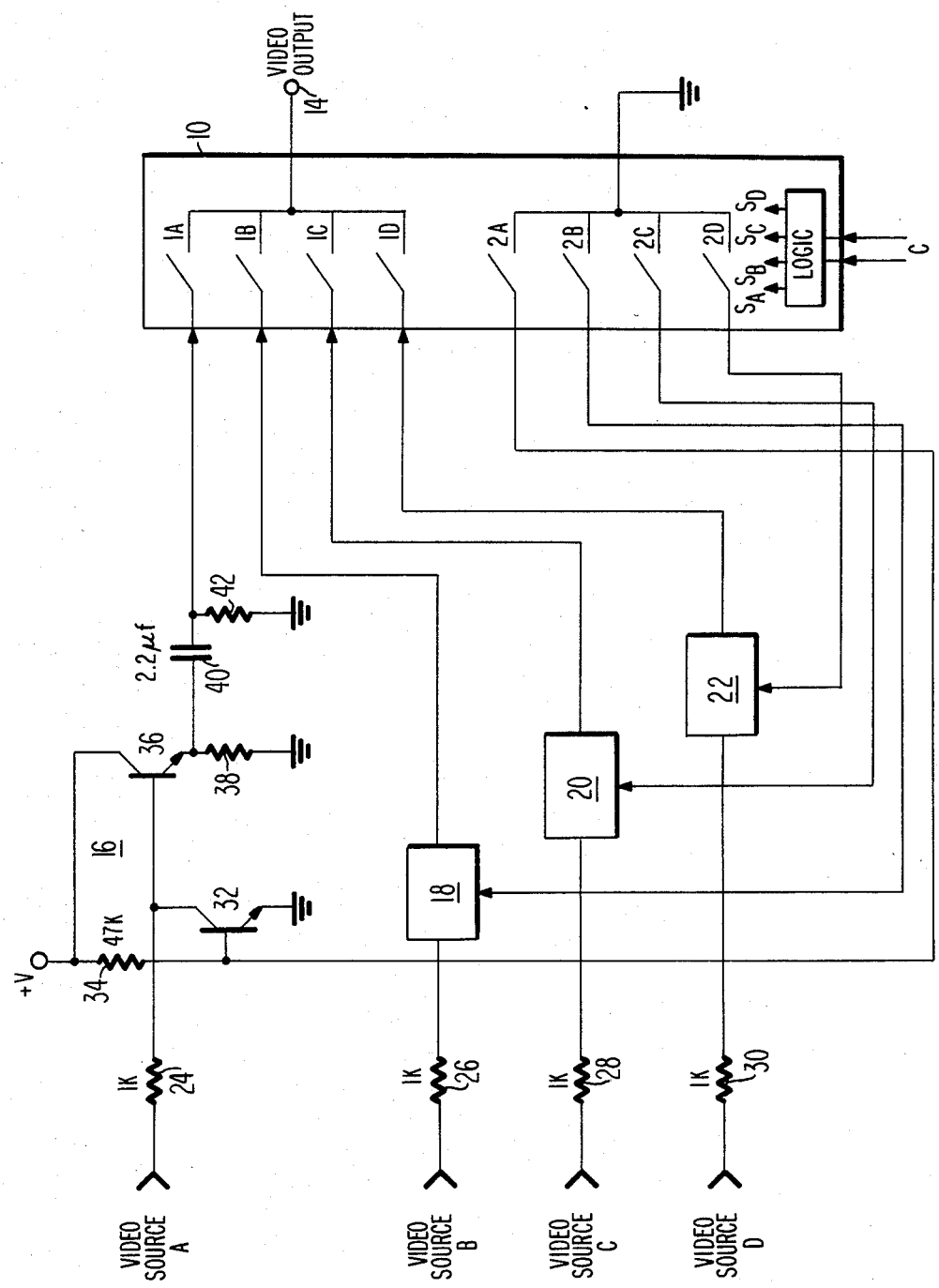

VIDEO SOURCE SELECTOR

This invention relates to electronic switching circuits and more particularly to a circuit for selecting one of a plurality of video signals to be applied, for example, to a television (TV) receiver or monitor for reproduction.

With the increased popularity of TV accessories, such as video disc and tape players, home video games and computers, alternate sources of video information for reproduction by a TV receiver or monitor are available in addition to the video conventionally derived from received radio frequency (RF) signals. Therefore it is desirable to provide a switching arrangement for selecting a particular source of video information. TV accessories typically provide modulated RF signals. RF switching circuits for selectively switching RF signals from different accessories are relatively costly and therefore undesirable for incorporation in a consumer TV receiver. In addition, such RF switching arrangements are not suitable for TV monitors which do not include a tuner.

Moreover, more and more accessories provide baseband video signals. However, video switching circuits are relatively expensive and commercially available switching circuits for lower frequency signals such as those intended for audio signals, are not suitable for video signals since they do not provide acceptable signal isolation at video signal frequencies.

The present invention is particularly directed to a simple and inexpensive analog switching arrangement for selectively conducting a video signal from a plurality of video signal sources to a common point.

In accordance with the principles of the present invention, the switching arrangement includes first and second groups of switches and a control arrangement for controlling the conduction of respective switches of the first and second groups in pairs in response to a coded selection signal. Preferably the first and second groups of switches are included in an integrated circuit such as the type intended for audio signals. Switches of the first group have their inputs coupled to respective ones of a plurality of video signal sources and their outputs coupled in common to an output terminal for selectively conducting the video signal from a selected one of the video signal sources to the common output terminal when one of the switches of the first group is rendered conductive in response to the coded selection signal. Switches of the second group have their inputs coupled in common to a first reference potential point and provide a respective control signal dependent on the conductive state of the switch at their output. A plurality of signal inhibiting elements selectively inhibit video signal from passing from respective video signal sources to respective switches of the first group in response to respective control signals provided at respective outputs of the paired switches of the second group.

The sole drawing illustrates, partially in block diagram form and partially in schematic diagram form, a video signal switching arrangement, constructed in accordance with the principles of the present invention, for selecting one of a plurality of video signal sources A–D for providing a baseband video signal from, for example, the demodulator output of a TV receiver, a video disco player, a video tape player and a home computer, respectively.

The video switching arrangement comprises a switch unit 10 including a first group of four switches 1A–1D and a second group of four switches 2A–2D. A 2-bit binary selection signal C is applied to logic circuitry 12 of switch arrangement 10 for generating switch control signals $S_A$–$S_B$, which selectively control the conduction of respective switches of the first and second groups in a paired manner. That is, switch 1A is caused to conduct at the same time with switch 2A, switch 1B with switch 2B, switch 1C with switch 2C and switch 1D with switch 2D. Preferably, switch unit 10 is an integrated circuit so that it is inexpensive and compact. One integrated circuit suitable for use as switch arrangement 10 is the CD 4052, which is commercially available from National Semiconductor Corp., Santa Clara, Calif., intended for use to select pairs of stereo audio signals. While this type of integrated circuit switch unit is inexpensive compared to video switch units it does not provide enough signal isolation (i.e., non-selected video signal pass-through of non-conductive switches and cross-coupling of video signal to other switch paths) to be useful as a video switch unit. The remaining portion of the structure shown in the FIGURE allows switch unit 10, suitable by itself only for audio switching, to be used in video signal switching applications.

The inputs of switches 1A–1D are coupled to respective video signals sources A–D and their outputs are coupled together to a common output terminal 14. Output terminal 14 may be coupled, for example, to the input terminal of a video signal processing section of a television receiver or monitor for reproducing an image from the selected video signal. The inputs of switches 2A–2D are coupled together to a reference potential point, shown as signal ground, and provide the reference potential at their outputs as a control signal when they are in their conductive state.

A plurality of video signal inhibiting stages 16, 18, 20 and 22 are coupled between video signal sources A–D and the respective inputs of switches 1A–1D for selectively inhibiting the coupling of video signal from video sources A–D to switch arrangement 10 in response to the control signals developed at the outputs of respective ones of switches 2A–2D. Electrostatic discharge protection resistors 24, 26, 28 and 30 are coupled between video sources A, B, C and D and inhibiting stages 16, 18, 20 and 22, respectively. These resistors serve to protect switch arrangement 10 from static discharges which may be conducted from the hand of the user when the connection to the video source is made.

Video signal inhibiting stage 16 includes a signal shunting transistor 32 having its emitter coupled to signal ground, its base coupled via a resistor 34 to a source of operating voltage V and its collector coupled to the output side of protection resistor 24. Biased in this manner, transistor 32 is normally conductive and shunts the video signal from source A to ground via its collector-emitter conduction path. However, the control signal provided at the output of switch 2A is also coupled to the base of transistor 32. When switch 2A is conductive (which is at the same time switch 1A is conductive), signal ground potential is applied to the base of transistor 32, causing it to be non-conductive and thereby cease shunting the video signal from source A.

A transistor 36 is connected as an emitter follower buffer amplifier having its collector coupled to the operating voltage source V, its emitter coupled to signal ground via a resistor 38 and its base connected to the output side of resistor 24. The emitter of transistor 36 is coupled through a coupling capacitor 40 to the input of switch 1A. A high impedance discharge resistor 42 is coupled in shunt between capacitor 40 and switch 1A for discharging capacitor 40 when switch 1A is non-conductive. When the video signal from source A is applied at its base, (i.e., when transistor 32 is not conductive), transistor 36 applies the video signal through coupling capacitor 40, to the input of switch 1A.

The construction of video signal inhibiting stages 18, 20 and 22 are similar to that described above with respect to stage 16.

In operation, to select video signal from source A, the binary code of selection signal C is set such that logic circuitry 12 develops switch control signal $S_A$. In response thereto, paired switches 1A and 2A are rendered conductive and the other switches (1B–1D and 2B–2D) remain in their non-conductive state. The conduction of switch 2A causes transistor 32 of stage 16 to be rendered non-conductive and thereby prevent the shunting of the video signal from source A. The selected video signal from source A is then passed to video output terminal 14 via buffer transistor 36, coupling capacitor 40 and conductive switch 1A.

However, transistors 32 of stages 18, 20 and 22 are still conductive and continue to shunt non-selected video signal from sources B, C and D to signal ground. Additionally, the conduction of shunting transistors 32 of stages 18, 20 and 22 alter the operating bias of buffer transistors 36 of stages 18, 20 and 22 so as to cause them to become non-conductive and present a high input impedance. In this manner, the level of the non-selected video signals is attenuated by both the signal shunting action provided by the conductive shunting transistors 32 of stages 18, 20 and 22 and voltage divider action provided by the high input impedance presented by the non-conductive buffer transistors 36 of stages 18, 20 and 22, respectively. This attenuation provides a signal isolation which, when combined with the relatively poor video signal isolation of switches 1A–1D, results in a video signal switch having excellent signal isolation characteristics.

The operation of stages 18–22 for coupling video signal from sources B–D to output terminal 14 in response to the generation of switch control signals $S_B$–$S_D$ is similar to the above-described operation for selecting video signal from source A.

Furthermore, as earlier noted, switching arrangement 10 may be constructed in integrated circuit from. When so constructed, electrostatic discharge protection resistors 24–30 are highly desirable for protecting switch unit 10 but also undesirable because they present a high source impedance which, especially at video frequencies, together with stray shunt capacitance, may severely attenuate the selected video signal. However, buffer transistors 36 serve to buffer the conduction paths of switches 1A–1D from the high impedance presented by electrostatic discharge protection resistors 24–30. This buffering allows an acceptable frequency response to be maintained by the switches for conducting the selected video signal to output terminal 14.

Thus what has been described is a video switching arrangement which employs an inexpensive audio switching arrangement but which has been found, unlike the audio switching arrangement by itself, to provide good signal isolation. While inhibiting stages 16–22 in the preferred embodiment use shunting switches it is also possible that they include series switches which are rendered conductive when the respective ones of switch 1A–1D are conductive. These and other modifications are intended to be within the scope of the present invention defined by the following claims.

We claim:

1. A video source selector comprising:
   a switch arrangement including first and second groups of switches, each switch having a conduction path coupled between an input and an output, the conduction of respective switches of said first group and of said second group being selectively controlled in pairs in response to a coded selection signal;
   said switches of said first group having their inputs coupled to respective ones of a plurality of video signal sources and their outputs coupled in common to an output terminal for selectively conducting video signal from a selected one of said video signal sources to said common output terminal when one of said switches of said first group is rendered conductive in response to said coded selection signal;
   each switch of said second group having its input coupled in common to a first reference potential point and providing a respective control signal dependent on the conductive state of said switch at its output; and
   a plurality of signal inhibiting elements, each element including a conduction path having one end coupled to a respective one of said video signal sources for selectively inhibiting video signal from passing from said respective video signal sources to said switches of said first group in response to respective ones of said control signal provided at the respective outputs of said switches of said second group.

2. The video source selector of claim 1, wherein said switch arrangement provides acceptable signal isolation between inputs and outputs of switches of said first group at signal frequencies less than video signal frequencies and by conduction of respective ones of said inhibiting elements in response to respective ones of said control signals provides acceptable signal isolation at video signal frequencies.

3. The video source selector of claim 2 wherein said first and second groups of switches are formed in a single integrated circuit, said integrated circuit including logic circuitry responsive to said coded selection signal for causing the paired switches of said first and second groups of switches to conduct synchronously.

4. The video source selector of claim 3 wherein each of said signal inhibiting elements includes a signal shunting device having a conduction path selectively rendered conductive in response to said respective ones of said control signals for shunting video signal from non-selected video signal sources to a second reference potential point.

5. The video source selector of claim 4 wherein in response to said coded selection signal one of said first switches conducts video signal from said selected video signal source to said common output terminal, said paired second switch conducts to generate a control signal which inhibits the shunting of video signal from said selected video signal source, and the remainder of said first and second switches do not conduct, whereby the passage of video signal from non-selected video signal sources to said common output terminal is inhibited.

6. The video source selector of claim 5 including ones of a plurality of signal buffer amplifiers coupled between said one end of the conduction path of each signal shunting device and a respective one of said first switches, respective ones of said signal buffer amplifiers being rendered non-conductive in response to conduction of respective ones of said signal shunting devices.

7. The video source selector of claim 6 wherein each of said signal shunting devices comprises a transistor having its main conduction path coupled between the output of said respective video signal source and said second reference potential point, said control signal being coupled to said transistor for causing it to conduct when said paired switch of said first switches is not conductive and for causing it to not conduct when said paired switch of said first switches is conductive.

8. The video source selector of claim 7 wherein said first and second reference potential points correspond to a common reference potential point.

* * * * *